US006162029A

United States Patent [19]

Fehlmann et al.

[11] Patent Number: 6,162,029

[45] Date of Patent: Dec. 19, 2000

[54] FILTERING THROTTLE ELEMENT FOR FUEL INJECTION PUMP

[75] Inventors: Wolfgang Fehlmann; Andreas Dutt, both of Stuttgart, Germany

[73] Assignee: Robert Bosch GmbH, Stuttgart, Germany

[21] Appl. No.: 09/066,573

[22] Filed: Apr. 27, 1998

[30] Foreign Application Priority Data

Apr. 25, 1997 [DE] Germany ........................... 297 07 496

[51] Int. Cl.[7] ............................. F04B 23/00; B01D 15/00

[52] U.S. Cl. ............................................ 417/441; 137/544

[58] Field of Search .............................. 137/544; 138/42; 417/441

[56] References Cited

U.S. PATENT DOCUMENTS

| | | | |
|---|---|---|---|
| 4,186,909 | 2/1980 | Patel | 137/544 |
| 4,676,273 | 6/1987 | Stoltman | 137/544 |
| 5,239,968 | 8/1993 | Rodríquez-Amaya | 123/506 |
| 5,333,637 | 8/1994 | Gravel | 137/544 |
| 5,937,909 | 8/1999 | Clauss | 138/43 |

*Primary Examiner*—Timothy S. Thorpe
*Assistant Examiner*—Michael K. Gray
*Attorney, Agent, or Firm*—Ronald E. Greigg; Edwin E. Greigg

[57] ABSTRACT

A throttle element installed in a blind bore of a connecting conduit which delivers fluid to cool an electromagnet. The throttle element includes a filter region upstream of a throttle which throttles flow of the fluid from an annular groove to the blind bore that connects with the electromagnet.

13 Claims, 1 Drawing Sheet

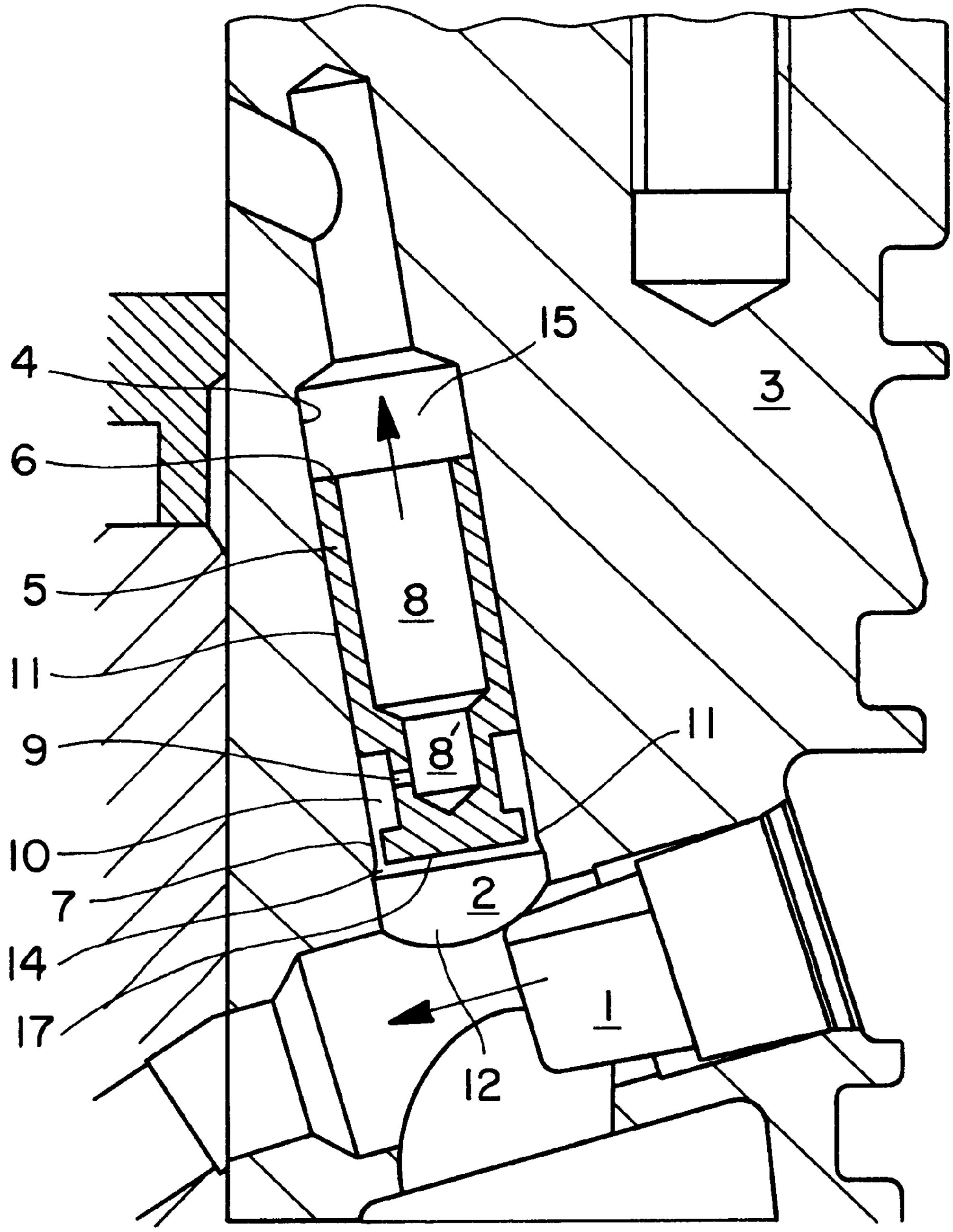
15
4
3
6
8
5
11
9
8'
11
10
2
7
14
1
17
12

FILTERING THROTTLE ELEMENT FOR FUEL INJECTION PUMP

BACKGROUND OF THE INVENTION

The invention is based on a throttle element as generically defined hereinafter. In such a throttle element, known from German Patent DE-C1 41 42 998, now U.S. Pat. No. 5,239,968, the throttle opening is embodied coaxially to the cylindrical insert and is press-fitted into the conduit in such a way that the circumferential wall of the throttle element forms a termination of the conduit over the length. Such throttle elements have the disadvantage that they can become plugged with dirt particles during operation, thus preventing the flow of liquid.

OBJECT AND SUMMARY OF THE INVENTION

By the embodiment according to the invention, it is now assured that a film precedes the throttle opening on the inflow side of the throttle element and assures that dirt particles entrained in the flow of liquid will already be filtered out upstream of the throttle opening. Advantageously, the filter is an annular gap, which is indeed larger in cross section than the throttle opening, but because of the great length of the annular gap, the gap width can be kept very slight, resulting in effective filtration here. It is advantageous to install the insert at a point of the conduit which is located near a perpendicular branching point of that conduit from another conduit through which liquid flows. The result obtained is that because of the liquid flowing past and not diverted into the conduit, dirt particles that have been trapped at the annular gap can be flushed away again.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE of the drawing shows a cross sectional view of an exemplary embodiment of the invention.

DESCRIPTION OF THE PREFERRED EMBODIMENT

In the drawing, a fragmentary view of a fuel injection pump, 3 is shown, with a connecting conduit 1 that carries fuel at low pressure, delivers fuel to a pump intake chamber not shown in further detail here, and having a conduit 2 branching off substantially at a right angle from this connecting conduit 1, the conduit 2 being intended here to carry fuel to an electromagnet that requires cooling. For metering this fuel delivery quantity through the conduit 2, a cylindrical insert 5 is introduced into a bore portion 4 of this conduit, preferably by press fitting. The insert is located near the branching point of the conduit 2 from the connecting conduit 1. From the first face end 6 of the insert, remote from the connecting conduit 1, a blind bore 8 leads into the interior of the insert, which is embodied as stepped here. Near the end 81 of an inner end blind bore 8, a radially extending throttle bore 9 branches off from the blind bore and connects with an annular groove 10 in 9 circumferential wall jacket face 11 of the insert. At the portion of the insert adjoining the annular groove 10 toward the connecting conduit and having its second face end 17 there, this insert has a reduced diameter on its circumference, so that at this point the jacket face and the wall 7 of the bore part 4 form an annular gap 14, which is part of the communication between the upstream area 12 and downstream area 15 of the conduit 2 relative to the insert. This annular gap 14 has a total cross section which is larger than the flow cross section of the throttle opening 9. However, since this larger cross section is distributed over the entire circumferential wall of the insert, the result is a gap width which is substantially smaller than the inside diameter of the throttle bore 9. Because of this property, this annular gap is excellently suited for filtering the inflowing fuel stream through the insert. This filtration point that precedes the throttle bore in the flow direction traps all the dirt particles that could impede the function of the throttle opening 9. Because moreover the end of the annular gap 14 is located within a backwater zone, namely the short blind portion between the connecting conduit 1 and the second face end 17 of the insert, eddies result within this region, which in turn are suitable for keeping trapped dirt particles from becoming deposited at the entrance to the annular gap, or for detaching them again from there if they are present. This accordingly assures that the annular gap will not become plugged. In this way, a throttle is obtained that functions uniformly over the service to control the fuel flow from the connecting conduit into the conduit 2 and for instance to a downstream electromagnet.

Naturally, the disposition of the throttle opening may be embodied in some other equivalent way. For instance, it may be located anywhere else in some other kind of communication or connection between the annular groove and an outlet on the downstream side of the insert.

The foregoing relates to a preferred exemplary embodiment of the invention, it being understood that other variants and embodiments thereof are possible within the spirit and scope of the invention, the latter being defined by the appended claims.

We claim:

1. A throttle element for installation into a housing of a fuel pump, comprising:

a fuel conduit (2) that leads from a connecting conduit (1), said fuel conduit including a bore portion (4) in the pump housing (3);

a cylindrical insert (5) introduced into said bore portion (4) of said fuel conduit (2), said cylindrical insert including a circumferential wall (11) and an axial blind bore (8), said axial blind bore extending into an interior of said cylindrical insert (5);

an annular groove (10) defined in said circumferential wall (11);

a throttle opening (9) extending from said annular groove (10) to said blind bore (8);

an annular gap (14) extending from said fuel conduit (2) to said annular groove (10), said annular gap (14) acting as a filter;

said annular gap (14) is defined by an inner wall (7) of the pump housing and said circumferential wall (11); and said annular groove (10) is situated between said annular gap (14) and a first end face (6) of the insert (5), said first end face (6) bordering a downstream end (15) of the fuel conduit (2).

2. A throttle element according to claim 1, wherein:

said annular gap (14) is situated between a second end face (17) of insert (5) and said annular groove (10), said second end face (17) bordering an upstream end of the fuel conduit (2).

3. A throttle element in accordance with claim 2, wherein:

said annular gap (14) has a total cross section which is larger than a cross section of the throttle opening (9).

4. The throttle element in accordance with claim 1, in which the insert (5) is installed in the bore portion (4) which adjoins the fuel conduit (2) where the fuel conduit (2) branches off, substantially at a right angle, of an inflow area (12) of the connecting conduit (1) through which the liquid flows.

5. The throttle element in accordance with claim 2, in which the insert (5) is installed in the bore portion (4) which adjoins the fuel conduit (2) where the fuel conduit (2) branches off, substantially at a right angle, of an inflow area (12) of the connecting conduit (1) through which the liquid flows.

6. The throttle element in accordance with claim 4, in which the conduit (2) together with the connecting conduit (1) form a backwater zone between a face end (17) of said cylindrical insert (5) and the connecting conduit (1).

7. The throttle element in accordance with claim 5, in which the conduit (2) together with the connecting conduit (1) form a backwater zone between a face end (17) of said cylindrical insert (5) and the connecting conduit (1).

8. The throttle element in accordance with claim 2, in which the insert is press-fitted into the bore portion (4) and has a circumferential region that is reduced in diameter to form the annular gap (14), and the throttle opening (9) is disposed radially at the annular groove (10) and discharges into the blind bore (8).

9. The throttle element in accordance with claim 3, in which the insert is press-fitted into the bore portion (4) and has a circumferential region that is reduced in diameter to form the annular gap (14), and the throttle opening (9) is disposed radially at the annular groove (10) and discharges into the blind bore (8).

10. The throttle element in accordance with claim 4, in which the insert is press-fitted into the bore portion (4) and has a circumferential region that is reduced in diameter to form the annular gap (14), and the throttle opening (9) is disposed radially at the annular groove (10) and discharges into the blind bore (8).

11. The throttle element in accordance with claim 5, in which the insert is press-fitted into the bore portion (4) and has a circumferential region that is reduced in diameter to form the annular gap (14), and the throttle opening (9) is disposed radially at the annular groove (10) and discharges into the blind bore (8).

12. The throttle element in accordance with claim 6, in which the insert is press-fitted into the bore portion (4) and has a circumferential region that is reduced in diameter to form the annular gap (14), and the throttle opening (9) is disposed radially at the annular groove (10) and discharges into the blind bore (8).

13. The throttle element in accordance with claim 7, in which the insert is press-fitted into the bore portion (4) and has a circumferential region that is reduced in diameter to form the annular gap (14), and the throttle opening (9) is disposed radially at the annular groove (10) and discharges into the blind bore (8).

* * * * *